United States Patent
Ono et al.

(10) Patent No.: US 8,924,135 B2
(45) Date of Patent: Dec. 30, 2014

(54) INTERNAL COMBUSTION ENGINE CONTROL APPARATUS

(75) Inventors: Takahiko Ono, Kobe (JP); Yuhei Matsushima, Chiyoda-ku (JP); Keitaro Ezumi, Aki-gun (JP); Tomokuni Kusunoki, Aki-gun (JP); Atsushi Inoue, Aki-gun (JP); Hiroki Morimoto, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 318 days.

(21) Appl. No.: 13/612,179

(22) Filed: Sep. 12, 2012

(65) Prior Publication Data

US 2013/0151128 A1    Jun. 13, 2013

(30) Foreign Application Priority Data

Dec. 12, 2011    (JP) .................................. 2011-270890

(51) Int. Cl.
*G06F 19/00*    (2011.01)
(52) U.S. Cl.
USPC ......................................................... 701/111
(58) Field of Classification Search
CPC ....... F01M 15/11; G01L 23/00; G01L 23/221
USPC ........ 701/111; 123/406.35–406.39; 73/35.01, 73/35.03, 35.04, 35.09
See application file for complete search history.

(56) References Cited

U.S. PATENT DOCUMENTS

| 6,867,691 | B2* | 3/2005 | Nishimura .................... 340/439 |
| 7,243,020 | B2* | 7/2007 | Nakao et al. .................. 701/111 |
| 8,301,360 | B2* | 10/2012 | Masuda et al. ................ 701/111 |
| 2012/0080008 | A1* | 4/2012 | Matsushima et al. ......... 123/436 |
| 2012/0192833 | A1* | 8/2012 | Hagari et al. ............ 123/406.35 |

FOREIGN PATENT DOCUMENTS

| JP | 4-140454 A | 5/1992 |
| JP | 2006-183662 A | 7/2006 |

* cited by examiner

*Primary Examiner* — John Kwon
(74) *Attorney, Agent, or Firm* — Sughrue Mion, PLLC; Richard C. Turner

(57) ABSTRACT

There are provided a combustion start determination unit that determines whether or not the inner-cylinder state of an internal combustion engine has changed from a non-combustion state to a combustion state; and a filter coefficient changing demand unit that outputs a filter coefficient changing demand until a predetermined filter coefficient changing period elapses from the time instant when the combustion start determination unit determines that the inner-cylinder state of the internal combustion engine has changed from the non-combustion state to the combustion state to the time instant. Based on the filter coefficient changing demand, at least one of a background level calculation unit and a standard deviation calculation unit changes the value of a filter coefficient utilized in a filtering operation to the one with which a filtering effect is weakened.

7 Claims, 7 Drawing Sheets

INTERNAL COMBUSTION ENGINE CONTROL APPARATUS

BACKGROUND OF THE INVENTION

1. Field of the Invention

The present invention relates to an internal combustion engine control apparatus provided with a function of correcting the ignition timing so as to suppress a knock from occurring, when based on a vibration produced in the internal combustion engine, it is determined that a knock has occurred; in particular, the present invention relates to an internal combustion engine control apparatus that prevents erroneous determination of a knock, while expanding the operation range of the knock suppression function at a time immediately after the inner-cylinder state of an internal combustion engine has changed from a non-combustion state to a combustion state.

2. Description of the Related Art

To date, there has been adopted an internal combustion engine control apparatus provided with a function of suppressing a knock from occurring by detecting with a knock sensor an inner-cylinder vibration produced when the internal combustion engine abnormally combusts and shifting the ignition timing toward the retarding side (delaying the ignition timing).

In an internal combustion engine control apparatus provided with such a knock suppression function, for example, a vibration of an internal combustion engine detected by a knock sensor is processed through a band-pass filter or the like so that only vibration components of specific frequencies are extracted; then, the value of a maximum level, in a predetermined crank angle range, of the vibration components of specific frequencies is extracted as a characteristic value of the vibration level in the present combustion cycle.

As the specific frequencies, frequencies (generally, frequencies of 5 through 15 kHz) are preliminarily selected with which the level of a vibration caused by the occurrence of a knock can be detected with high sensitivity. The crank angle range (generally, from the compression top dead center to approximately 60 [deg] after the compression top dead center), in which the level of a vibration caused by the occurrence of a knock can be detected with high sensitivity, is also preliminarily selected; in general, the crank angle range is referred to as a knock detection range.

After characteristic values for characterizing vibration levels are extracted, a background level (referred to as a BGL, hereinafter) is calculated by averaging the characteristic values through a filtering operation; the standard deviation of the characteristic values is calculated through a filtering operation based on the characteristic values and the BGL; then, a knock determination threshold value for determining of the occurrence of a knock is calculated based on the BGL and the standard deviation.

After the knock determination threshold value is calculated, it is determined whether or not a knock has been produced, by comparing the characteristic value with the knock determination threshold value. In the case where the characteristic value is the same as or smaller than the knock determination threshold value, it is determined that no knock has been produced; then, the knock intensity indicating the intensity of a vibration caused by a knock is set to "0". In contrast, in the case where the characteristic value exceeds the knock determination threshold value, it is determined that a knock has been produced; then, the knock intensity is calculated based on the characteristic value, the BGL, and the knock determination threshold value. After the knock intensity is calculated, a knock retarding amount corresponding to the knock intensity is calculated; then, the ignition timing is shifter by the retarding amount toward the retarding side.

When through a series of foregoing processing items, it is determined that a knock has been produced, based on the vibration of the internal combustion engine detected by the knock sensor, the ignition timing is shifted toward the retarding side in accordance with the intensity of the vibration caused by the knock, so that the occurrence of a knock is suppressed.

Meanwhile, it is known that the level of a vibration that can be detected by a knock sensor largely varies depending on the operation status of the internal combustion engine. For example, when an internal combustion engine in the stop mode is started, supply of a fuel into the internal combustion engine, which has been started to rotate by a starter motor, is started, and a compressed fuel-air mixture is ignited; combustion occurs inside the cylinder; transition from the non-combustion state to the combustion state is made; then, the internal combustion engine comes into the starting mode. In this starting mode, the internal combustion engine is in a transient mode where the rotation speed thereof transiently changes before it comes into a stabilized operation status; therefore, the level of a vibration that is detected by the knock sensor largely changes.

Accordingly, in the case where when the internal combustion engine is in the starting mode, the foregoing BGL and standard deviation are calculated by utilizing the filter coefficient, as it is, that is set to an appropriate value based on the assumption that the internal combustion engine is in a steady operation status, the filtering effect becomes extremely high, whereby the tracking capability for the behavior of the largely changing characteristic value is deteriorated; as a result, the knock determination threshold value becomes inappropriate, whereby there is posed a problem that knock determination is erroneously implemented.

Accordingly, in Patent Document 1 (Japanese Patent Application Laid-Open No. 2006-183662), there has been proposed a technology in which when an internal combustion engine is being started, knock determination is prohibited until a time required for the BGL calculated through a filtering operation to catch up with a right value elapses. This conventional technology prevents the erroneous determination caused by a tracking delay in the filtering operation at a time when the internal combustion engine is started.

Moreover, in Patent Document 2 (Japanese Patent Application Laid-Open No. H4-140454), there has been proposed a technology in which based on the changing level of the rotation speed of an internal combustion engine, it is determined whether or not the internal combustion engine has come into a transient operation status, and in the case where it is determined that the internal combustion engine has come into a transient operation status, the filter coefficient for calculating the BGL is shifted to the side where the filtering effect is weakened. This conventional technology prevents erroneous knock determination caused by a tracking delay in the filtering operation at a time when the internal combustion engine is in a transient operation status.

PRIOR ART REFERENCE

Patent Document

[Patent Document 1] Japanese Patent Application Laid-Open No. 2006-183662
[Patent Document 2] Japanese Patent Application Laid-Open No. H4-140454

In the case where the conventional technology disclosed in Patent Document 1 is adopted, even though there is prevented the erroneous knock determination caused by a tracking delay in the filtering operation at a time when the internal combustion is started, the filtering operation is implemented by utilizing the filter coefficient, as it is, that is set to an appropriate value based on the assumption that the internal combustion engine is in a steady operation status; therefore, from a viewpoint that it is desired that after the internal combustion engine has been started, the operation range of the knock suppression function is expanded as early as possible, there is posed a problem that the operation range of the knock suppression function is narrowed because the knock determination is prohibited until the result of the filtering operation, which utilizes the filter coefficient set to an appropriate value based on the assumption that the internal combustion engine is in a steady operation status, catches up with a right value.

In a typical internal combustion engine, so-called fuel cutoff control is adopted in which even when the internal combustion engine is being operated, supply of a fuel is temporarily stopped when a predetermined condition is satisfied. The fuel cutoff control is a control method, for example, in which when an internal combustion engine is being operated and supply of a fuel is stopped by removal of the driver's foot from the accelerator pedal stops, the supply of a fuel is resumed when the driver depresses the accelerator pedal again or when the rotation speed of the internal combustion engine lowers to a predetermined value while the driver's foot is away from the accelerator pedal; the fuel cutoff control is widely adopted for the purpose of raising the gasoline mileage and preventing the rotation speed from excessively rising.

When a predetermined condition is satisfied while the internal combustion is being operated and then the fuel cutoff control is implemented, supply of a fuel is stopped and hence the state of the inside of the cylinder changes from the combustion state to the non-combustion state; therefore, the level of the vibration that has been caused by the combustion disappears, whereby the characteristic value becomes smaller, and the BGL also changes to an extremely small value.

When after that, the predetermined condition becomes unsatisfactory and hence the fuel cutoff control is cancelled, the supply of a fuel is resumed and the state of the inside of the cylinder reversely changes from the non-combustion state to the combustion state; therefore, the vibration level instantaneously returns to the level at a time when the fuel combusts. As a result, the characteristic value changes at once from a small value, which has been calculated when the fuel cutoff control was performed, to a large value. However, because the BGL and the standard deviation are calculated through a filtering operation utilizing the filter coefficient set to an appropriate value based on the assumption that the internal combustion engine is in a steady operation status, the operation result for the BGL and the standard deviation cannot keep up with the change in the characteristic value; therefore, the knock determination threshold value becomes an inappropriate value (smaller than the right value) until the BGL and the standard deviation catch up with the right value. As a result, there is posed a problem that when the fuel cutoff control is cancelled, knock determination is erroneously performed.

Even when the conventional technology disclosed in Patent Document 2 is adopted, it is not determined, when the fuel cutoff control is cancelled, that the internal combustion engine is in a transient operation status, for example, in the case where because the gear of the transmission is connected with the internal combustion engine, no large change appears in the rotation speed of the internal combustion engine; therefore, the filter coefficient is not changed, whereby erroneous knock determination caused by the filtering operation cannot perfectly be prevented.

SUMMARY OF THE INVENTION

The present invention has been implemented in order to solve the foregoing problems; the objective thereof is to provide an internal combustion engine control apparatus that can prevent erroneous knock determination, without narrowing the operation range of the knock suppression function at a time immediately after the inner-cylinder state of an internal combustion engine has changed from the non-combustion state to the combustion state.

An internal combustion engine control apparatus according to the present invention includes a knock sensor that detects a vibration produced in an internal combustion engine; a crank angle sensor that detects a crank angle of the internal combustion engine; a characteristic value calculation unit that calculates a characteristic value for characterizing a vibration level of the vibration in a predetermined crank angle range, based on the vibration detected in the predetermined crank angle range; a background level calculation unit that calculates a background level of the characteristic value, based on the characteristic value and a first filter coefficient utilized for averaging the characteristic value; a standard deviation calculation unit that calculates a standard deviation of the characteristic value, based on the characteristic value, the background level, and a second filter coefficient utilized for calculating a standard deviation of the characteristic value; a threshold value calculation unit that calculates a knock determination threshold value, based on the background level and the standard deviation; a knock determination unit that determinates whether or not a knock has been produced, based on the characteristic value and the knock determination threshold value; a knock intensity calculation unit that calculates a knock intensity, based on the characteristic value, the background level, and the knock determination threshold value, when the knock determination unit determines that a knock has been produced; a retarding amount calculation unit that calculates a knock retarding amount for an ignition timing of the internal combustion engine, based on the knock intensity; an ignition timing correction unit that corrects an ignition timing, based on the knock retarding amount; a combustion start determination unit that determines, based on the various information items indicating operation statuses of the internal combustion engine, whether or not the inner-cylinder state of the internal combustion engine has changed from a non-combustion state to a combustion state; and a filter coefficient changing demand unit that outputs a filter coefficient changing demand until a predetermined filter coefficient changing period elapses from the time instant when the combustion start determination unit determines that the inner-cylinder state of the internal combustion engine has changed from a non-combustion state to a combustion state to the time instant.

The internal combustion engine control apparatus according to the present invention is characterized in that based on the filter coefficient changing demand issued by the filter coefficient changing demand unit, at least one of (1) and (2) below is performed:

(1) The background level calculation unit changes the value of the first filter coefficient to the one with which a filtering effect is weakened.

(2) The standard deviation calculation unit changes the value of the second filter coefficient to the one with which a filtering effect is weakened.

The present invention according to the present invention can suppress erroneous knock determination caused by a filtering-operation delay in tracking a change in the vibration level, without narrowing the operation range of the knock suppression function at a time immediately after the inner-cylinder state of the internal combustion engine has changed from the non-combustion state to the combustion state.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
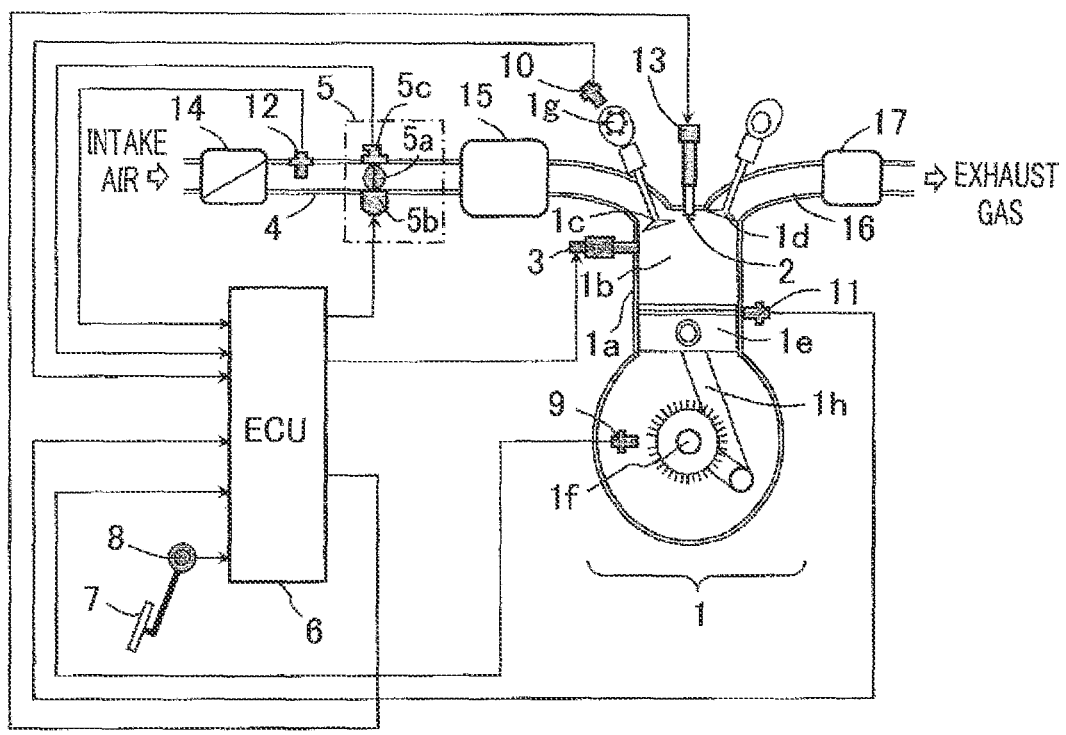
FIG. 1 is an overall configuration diagram of an internal combustion engine control apparatus according to Embodiment 1 of the present invention.

With reference to the accompanying drawings, preferred embodiments of an internal combustion engine control apparatus according to the present will be explained below. FIG. 1 is an overall configuration diagram of an internal combustion engine control apparatus according to Embodiment 1 of the present invention. A combustion chamber $1b$ of a cylinder $1a$ in an internal combustion engine 1 is provided with an intake valve $1c$, an exhaust valve $1d$, and a piston $1e$; furthermore, an ignition plug 2 and a fuel injection valve 3 are provided in such a way as to view the combustion chamber $1b$.

In the internal combustion engine 1, the air-intake amount is adjusted by an electronically-controlled throttle 5 provided in an air-intake path 4. The electronically-controlled throttle 5 is configured with a throttle valve $5a$, a motor $5b$ that drives the throttle valve $5a$, and a throttle opening degree sensor $5c$ that detects the opening degree of the throttle valve $5a$.

An internal combustion engine control unit (referred to as an ECU, hereinafter) 6 receives the output signal of an accelerator position sensor 8 that detects the operation amount of an accelerator pedal 7, transmits a control signal to the motor $5b$, and controls the throttle valve $5a$, based on a throttle valve opening degree signal from the throttle opening degree sensor $5c$, in such a way that the opening degree of the throttle valve $5a$ becomes an appropriate value. The ECU 6 receives output signals from various kinds of sensors (unillustrated) such as the accelerator position sensor 8, a crank angle sensor 9, a cam angle sensor 10, a knock sensor 11, and an air flow sensor 12, and determines the ignition timing, the fuel injection amount, and the like.

Based on the determined values, the ECU 6 drives the fuel injection valve 3 so as to inject and supply a fuel into the combustion chamber $1b$, and drives an ignition coil 13 connected with the ignition plug 2 so that a spark is discharged from the plug gap of the ignition plug 2.

After its flow rate is measured by the air flow sensor 12, an intake air, from which dust and particulates have been removed by an air cleaner 14, is lead into a surge tank 15 after passing through the electronically-controlled throttle 5; then, the intake air is further lead into the combustion chamber $1b$ after passing through the intake valve $1c$. The intake air lead into the combustion chamber $1b$ and the fuel injected from the fuel injection valve 3 are mixed with each other so as to form a fuel-air mixture; by being ignited through a spark discharge from the ignition plug 2, the fuel-air mixture combusts.

The combustion pressure of the fuel-air mixture is transferred to the piston $1e$ so as to make the piston $1e$ reciprocate. The reciprocal motion is transferred to a crankshaft $1f$ through a connecting rod $1h$, converted into rotary motion through the crankshaft $1f$, and extracted as the output of the internal combustion engine 1. After combusting, the fuel-air mixture becomes exhaust gas; the exhaust gas passes through the exhaust valve $1d$ and is exhausted to an exhaust manifold 16; then, after being purified by a catalyst 17, the exhaust gas is exhausted to the air.

Figure 2:
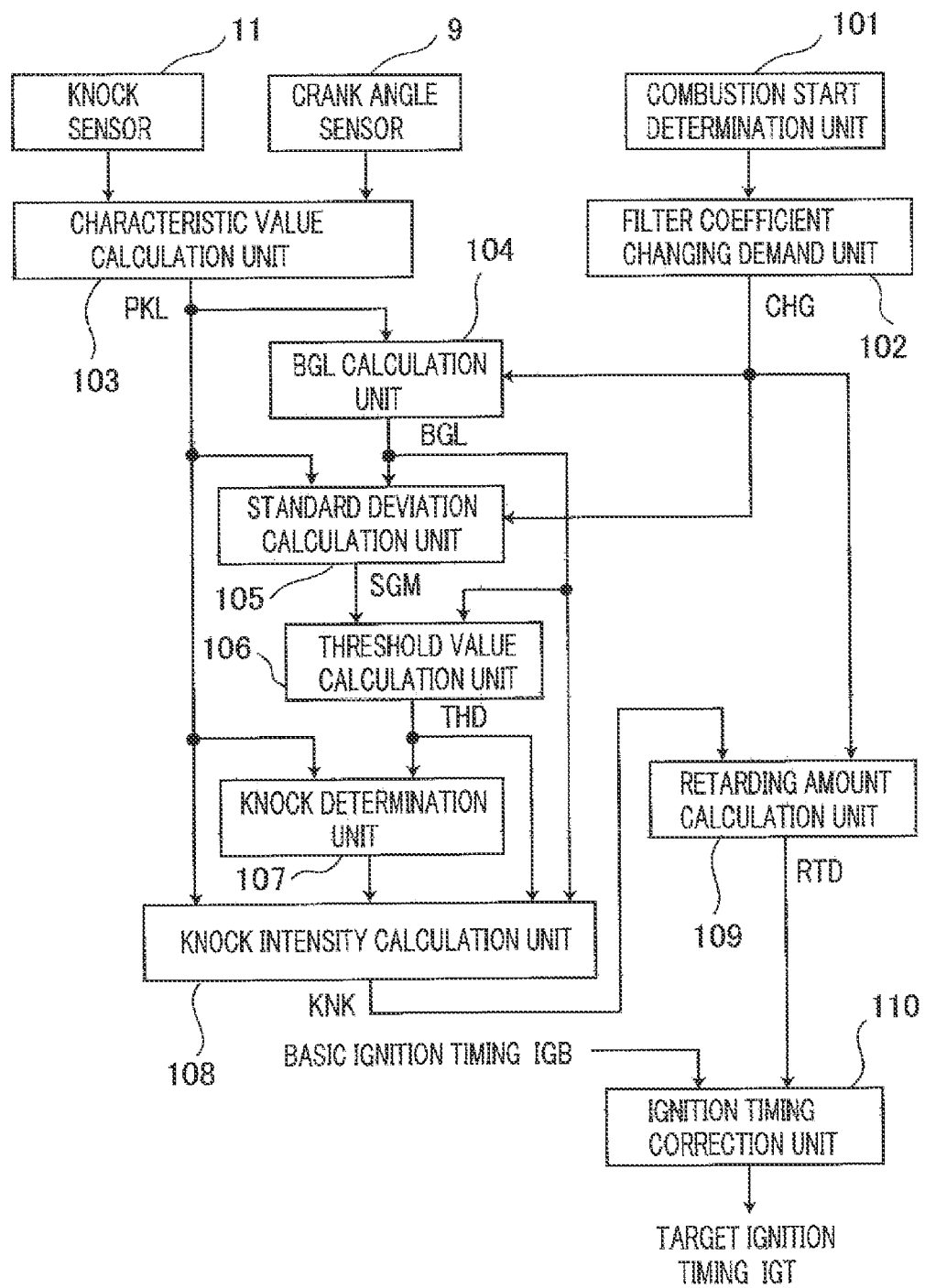
FIG. 2 is a functional block diagram for explaining a knock suppression function in an internal combustion engine control apparatus according to Embodiment 1 of the present invention.

Next, the knock suppression function, which is implemented in the ECU 6, will be explained. FIG. 2 is a functional block diagram for explaining a knock suppression function in an internal combustion engine control apparatus according to Embodiment 1 of the present invention. In FIG. 2, various information items (unillustrated) indicating the operation statuses of an internal combustion engine are inputted to a combustion start determination unit 101. Based on the various information items, the combustion start determination unit 101 determines whether or not the inner-cylinder state has changed from the non-combustion state to the combustion state. Based on the result of determination by the combustion start determination unit 101, a filter coefficient changing demand unit 102 sets a filter coefficient changing demand CHG and outputs the filter coefficient changing demand CHG to a background level calculation unit (referred to as a BGL calculation unit, hereinafter) 104, a standard deviation calculation unit 105, and a retarding amount calculation unit 109, which are described later.

In addition, in the case where when the internal combustion engine is started, it is determined whether the inner-cylinder state of the internal combustion engine is the non-combustion state or the combustion state, a control signal for the starter motor, a control signal for the fuel injection valve 3, a control signal for the ignition coil 13 (which are unillustrated), and the like are utilized as various information items to be inputted to the combustion start determination unit 101.

In the case where because the internal combustion engine is in the stop mode, it is determined that the inner-cylinder state is in the non-combustion state, the filter coefficient changing demand unit 102 resets the filter coefficient changing demand CHG to "0". Then, in the case where when the internal combustion engine is started, it is determined that the inner-cylinder state of the internal combustion engine has changed from the non-combustion state to the combustion state, the filter coefficient changing demand unit 102 sets the filter coefficient changing demand CHG to "1"; after that, when a filter coefficient changing period has elapsed, the filter coefficient changing demand CHG is reset to "0" again.

In addition, in the case where when the fuel cutoff control is cancelled, it is determined whether the inner-cylinder state of the internal combustion engine is the non-combustion state or the combustion state, a fuel cutoff control signal, a control signal for the fuel injection valve 3, a control signal for the ignition coil 13 (which are unillustrated), and the like are utilized as various information items to be inputted to the combustion start determination unit 101.

In the case where because the fuel cutoff control has been implemented, it is determined that the inner-cylinder state is in the non-combustion state, the filter coefficient changing demand unit 102 resets the filter coefficient changing demand CHG to "0". Then, in the case where when the fuel cutoff control is cancelled, it is determined that the inner-cylinder state of the internal combustion engine has changed from the non-combustion state to the combustion state, the filter coefficient changing demand unit 102 sets the filter coefficient changing demand CHG to "2"; after that, when a filter coefficient changing period has elapsed, the filter coefficient changing demand CHG is reset to "0" again.

Meanwhile, a vibration of the internal combustion engine detected by the knock sensor 11, which is an analogue signal, is converted into a digital signal by an A/D converter (unillustrated) and then inputted to a characteristic value calculation unit 103. A crank angle detected by the crank angle sensor 9 is also inputted to the characteristic value calculation unit 103. The characteristic value calculation unit 103 applies, for example, band-pass filter processing to the vibration data, which has been converted into a digital signal, so as to extract only specific-frequency vibration components, and extracts based on a crank angle, as a characteristic value PKL that characterizes a vibration level in the present combustion cycle, the maximum value among the extracted specific-frequency vibration components in a predetermined crank angle range.

The filter coefficient changing demand CHG from the filter coefficient changing demand unit 102 and the characteristic value PKL calculated by the characteristic value calculation unit 103 are inputted to the BGL calculation unit 104. Based on the characteristic value PKL and a first filter coefficient F1 (unillustrated) utilized for calculating a BGL, the BGL calculation unit 104 calculates the background level BGL corresponding to the average value of the characteristic values PKLs, by use of the equation (1) below.

$$BGL=(1-F1) \times PKL+(F1 \times [BGL \text{ last value}]) \qquad (1)$$

The first filter coefficient F1 utilized for calculating a BGL is set to a value between "0" and "1"; as the first filter coefficient F1 is set to a smaller value, the filtering effect becomes weaker, and as the first filter coefficient F1 is set to a larger value, the filtering effect becomes stronger.

In the case where the filter coefficient changing demand CHG is "0", the BGL calculation unit 104 sets the first filter coefficient F1 to a value Mn (0<Mn<1) that is set for the purpose of making the BGL to be appropriately calculated while there varies the characteristic value PKL at a time when the internal combustion engine is in the steady operation status; then, the BGL calculation unit 104 performs the calculation of the equation (1).

In the case where the filter coefficient changing demand CHG is "1", the BGL calculation unit 104 sets the first filter coefficient F1 to a value Ms (0<Ms<Mn<1) that is set for the purpose of suppressing delay in calculating the BGL as much as possible while there varies the characteristic value PKL at a time immediately after when the internal combustion engine is started, the inner-cylinder state has changed from the non-combustion state to the combustion state; then, the BGL calculation unit 104 performs the calculation of the equation (1).

In the case where the filter coefficient changing demand CHG is "2", the BGL calculation unit 104 sets the first filter coefficient F1 to a value Mf (0<Mf<Mn<1) that is set for the purpose of suppressing delay in calculating the BGL as much as possible while there varies the characteristic value PKL at a time immediately after when the fuel cutoff control is cancelled, the inner-cylinder state has changed from the non-combustion state to the combustion state; then, the BGL calculation unit 104 performs the calculation of the equation (1).

The filter coefficient changing demand CHG from the filter coefficient changing demand unit 102, the characteristic value PKL calculated by the characteristic value calculation unit 103, and the BGL calculated by the BGL calculation unit 104 are inputted to the standard deviation calculation unit 105. Based on the characteristic value PKL, the BGL, and a second filter coefficient F2 (unillustrated) utilized for calculating a variance, the standard deviation calculation unit 105 calculates the variance VAR of the characteristic values PKLs by use of the equation (2) below; then, the standard deviation calculation unit 105 calculates a standard deviation SGM by use of the equation (3) below.

$$VAR=(1-F2) \times (PKL-BGL)2+(F2 \times [VAR \text{ last value}]) \qquad (2)$$

$$SGM= \qquad (3)$$

The second filter coefficient F2 utilized for calculating the variance VAR is set to a value between "0" and "1"; as the second filter coefficient F2 is set to a smaller value, the filtering effect becomes weaker, and as the second filter coefficient F2 is set to a larger value, the filtering effect becomes stronger.

In the case where the filter coefficient changing demand CHG is "0", the standard deviation calculation unit 105 sets the second filter coefficient F2 to a value Nn (0<Nn<1) that is set for the purpose of making the variance VAR and the standard deviation SGM to be appropriately calculated while there varies the characteristic value PKL at a time when the internal combustion engine is in the steady operation status; then, the standard deviation calculation unit 105 performs the calculation of the equation (2).

In the case where the filter coefficient changing demand CHG is "1", the standard deviation calculation unit 105 sets the second filter coefficient F2 to a value Ms (0<Ns<Nn<1) that is set for the purpose of suppressing delay in calculating the variance VAR and the standard deviation SGM as much as possible while there varies the characteristic value PKL at a time immediately after when the internal combustion engine is started, the inner-cylinder state has changed from the non-combustion state to the combustion state; then, the BGL calculation unit 104 performs the calculation of the equation (2).

In the case where the filter coefficient changing demand CHG is "2", the standard deviation calculation unit 105 sets the second filter coefficient F2 to a value Nf (0<Nf<Nn<1) that is set for the purpose of suppressing delay in calculating the variance VAR and the standard deviation SGM as much as possible while there varies the characteristic value PKL at a time immediately after when the fuel cutoff control is cancelled, the inner-cylinder state has changed from the non-combustion state to the combustion state; then, the BGL calculation unit 104 performs the calculation of the equation (2).

The BGL calculated by the BGL calculation unit 104 and the standard deviation SGM calculated by the standard deviation calculation unit 105 are inputted to a threshold value calculation unit 106. Then, the threshold value calculation unit 106 calculates a knock determination threshold value THD by use of the equation (4) below.

$$THD=BGL+(K1 \times SGM) \quad (4)$$

where K1 is an adjustment coefficient that is preliminarily set for the purpose of calculating the THD.

The characteristic value PKL calculated by the characteristic value calculation unit 103 and the knock determination threshold value THD calculated by the threshold value calculation unit 106 are inputted to a knock determination unit 107. Then, the knock determination unit 107 compares the characteristic value PKL with the knock determination threshold value THD; in the case where the THD is the same as or larger than the PKL, it is determined that no knock has been produced; in the case where the THD is smaller than the PKL, it is determined that a knock has been produced.

The characteristic value PKL calculated by the characteristic value calculation unit 103, the BGL calculated by the BGL calculation unit 104, the knock determination threshold value THD calculated by the threshold value calculation unit 106, and the result of determination by the knock determination unit 107 on whether or not a knock has been produced are inputted to a knock intensity calculation unit 108. In the case where the knock determination unit 107 determines that no knock has been produced, the knock intensity calculation unit 108 sets a knock intensity KNK to "0". In contrast, in the case where that it is determined that a knock has been produced, the knock intensity calculation unit 108 calculates the knock intensity KNK by use of the equation (5) below, based on the characteristic value PKL, the BGL, the knock determination threshold value THD.

$$KNK=(PKL-THD)/BGL \quad (5)$$

The knock intensity KNK calculated by the knock intensity calculation unit 108 is inputted to the retarding amount calculation unit 109. Then, the retarding amount calculation unit 109 calculates a knock retarding amount RTD by use of the equation (6) below.

$$RTD=K2 \times KNK \quad (6)$$

where K2 is a predetermined coefficient that is preliminarily set for the purpose of converting the knock intensity KNK into the knock retarding amount RTD.

The filter coefficient changing demand CHG from the filter coefficient changing demand unit 102 is inputted to the retarding amount calculation unit 109; immediately after the CHG changes from "0" to non-zero, the retarding amount calculation unit 109 prohibits the knock retarding amount RTD from being updated (e.g., the last value of the RTD is kept) or prohibits the RTD from being calculated (the RTD is reset to "0") until the retard calculation limit period elapses. When the internal combustion engine control apparatus to which the filter coefficient changing control according to the present invention is applied is operated, the mal-detection tolerance is evaluated; then, the retard calculation limit period is preliminarily set, as may be necessary.

The knock retarding amount RTD calculated by the retarding amount calculation unit 109 and a basic ignition timing IGB calculated in the ECU 6 are inputted to an ignition timing correction unit 110. Then, by use of the equation (7) below, the ignition timing correction unit 110 determines a final ignition timing IGT by shifting the basic ignition timing IGB by the knock retarding amount RTD toward the retarding side.

$$IGT=IGB-RTD \quad (7)$$

When no knock is produced, the knock intensity KNK is set to "0" and hence the knock retarding amount RTD becomes "0"; thus, the final ignition timing IGT is reset to the basic ignition timing IGB.

Figure 3:
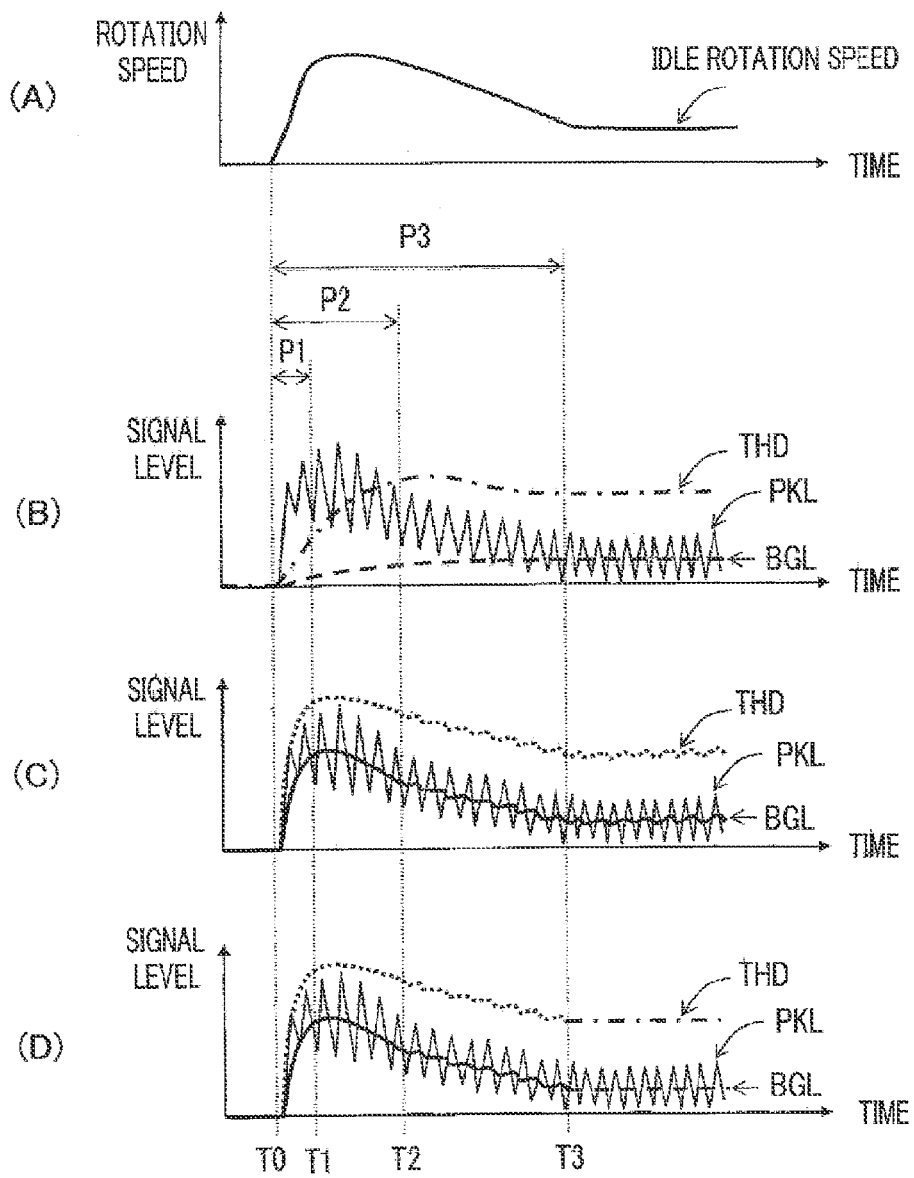
FIG. 3 is a timing chart for explaining the operation of an internal combustion engine control apparatus according to Embodiment 1 of the present invention.
Figure 4:
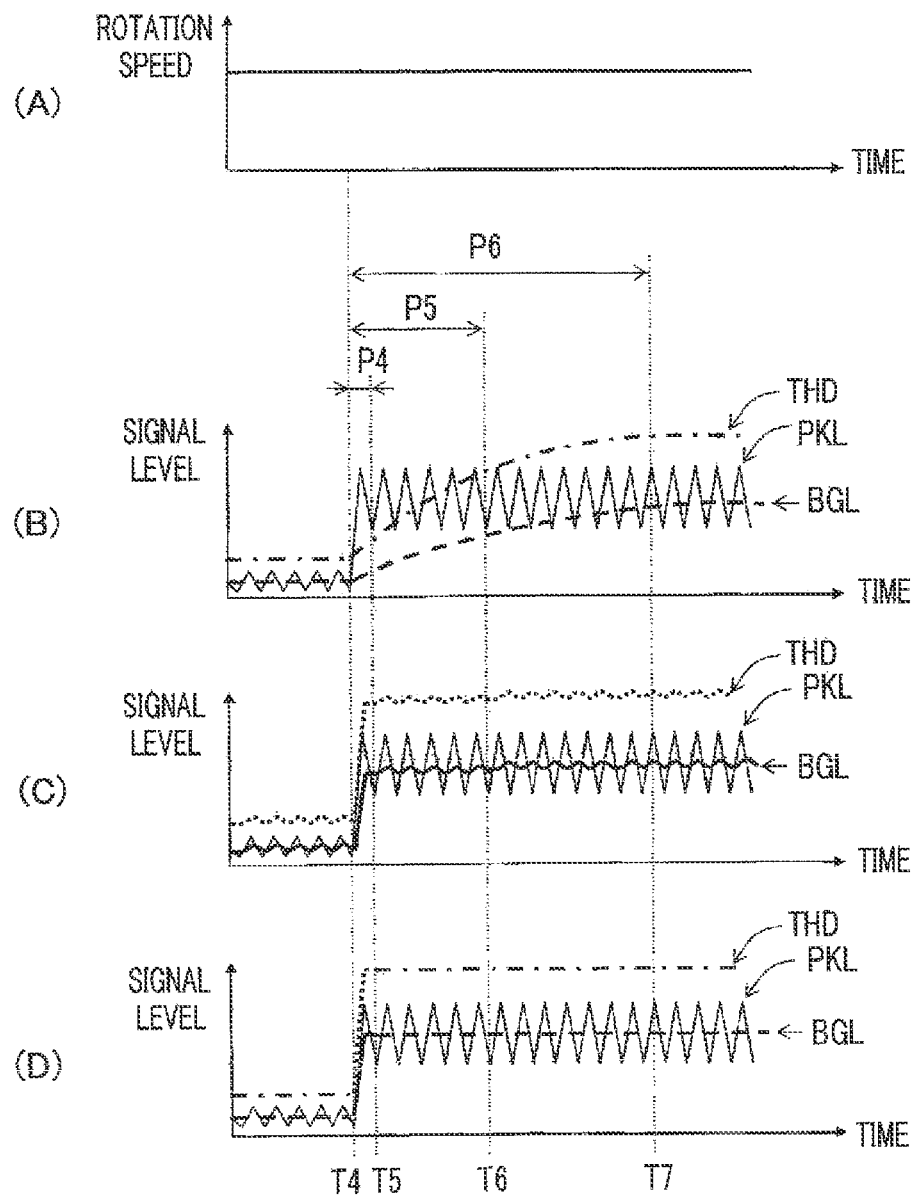
FIG. 4 is a timing chart for explaining the operation of an internal combustion engine control apparatus according to Embodiment 1 of the present invention.

Next, with reference to FIGS. 3 and 4 representing the calculation of the BGL and the knock determination threshold value THD, there will be explained the respective setting methods for the filter coefficient changing demand to be set in the filter coefficient changing demand unit 102 and the retard calculation limit period to be set in the retarding amount calculation unit 109.

FIG. 3 is a timing chart for explaining the operation of the internal combustion engine control apparatus according to Embodiment 1 of the present invention; with the abscissa denoting the time, there are represented the respective calculation statuses of the rotation speed of the internal combustion engine, the characteristic value PKL, the BGL, and the knock determination threshold value THD at a time when the internal combustion is started.

FIG. 3(A) represents an example of behavior of the rotation speed of the internal combustion engine at a time when the internal combustion is started; there is represented the behavior in which when starting operation is implemented at the time instant T0 and hence combustion starts, the rotation speed steeply rises once and then stabilizes to a steady operation status (e.g., an idle rotation speed).

FIG. 3(B) represents in a time series manner the characteristic value PKL (the thin solid line) calculated in a plurality of combustion cycles, the BGL (the thick broken line) at a time when filtering operation is performed by use of the first filter coefficient F1 (=Mn) and the second filter coefficient F2 (=Nn), which are set for the steady operation, and the knock determination threshold value THD (the thick dashed line).

FIG. 3(C) represents in a time series manner the characteristic value PKL (the thin solid line) calculated in a plurality of combustion cycles, the BGL (the thick solid line) at a time when filtering operation is performed by use of the first filter coefficient F1 (=Ms) and the second filter coefficient F2 (=Ns), which are set for starting operation, and the knock determination threshold value THD (the thick dotted line).

FIG. 3(D) represents in a time series manner the characteristic value PKL (the thin solid line) calculated in a plurality of combustion cycles, the BGL (the thick solid line and the thick broken line) at a time when based on the filter coefficient changing period set according to the present invention, filtering operation is performed by changing the respective filter coefficients (F1=Ms and F2=Ns) for starting operation and the respective filter coefficient (F1=Mn and F2=Nn) for steady operation, and the knock determination threshold value THD (the thick dotted line and the thick dashed line).

In FIGS. 3(A) through 3(D), when the internal combustion engine in the stop mode is started at the time instant T0, the inner-cylinder state changes from the non-combustion state to the combustion state and hence the rotation speed rises, whereupon the characteristic value PKL largely fluctuates. In FIGS. 3(B), 3(C), and 3(D), the respective waveforms of the characteristic values PKLs are the same.

In FIG. 3(B), filtering operation is performed by use of the filter coefficients (F1=Mn and F2=Nn) set to appropriate values based on the assumption that the internal combustion engine is in a steady operation status; therefore, in the period P3 (from the time instant T0 to the time instant T3), calculation of the BGL and the knock determination threshold value THD is delayed in comparison with the transient behavior of the characteristic value PKL at a time when the internal combustion engine is started. As a result, in the period P2 (from the time instant T0 to the time instant T2), the characteristic value PKL exceeds the knock determination threshold value THD; thus, knock determination is erroneously implemented.

Accordingly, in conventional technologies, in order to prevent the mal-determination, knock determination is prohibited in a period (the period P3, in FIG. 3) required for the BGL and the knock determination threshold value THD to catch up with the right values. Therefore, in conventional technologies, the knock suppression function does not work until the period P3 elapses from the start of the internal combustion engine.

In contrast, in FIG. 3(C), filtering operation is performed by use of the filter coefficients (F1=Ms and F2=Ns) set in such a way that the calculation is suppressed as much as possible from being delayed in comparison with the transient behavior of the characteristic value PKL at a time when the internal combustion engine is started; therefore, even though the delay in calculating the BGL and the knock determination threshold value THD remain in the period P1 (from the time instant T0 to the time instant T1), the delay in catching up is eliminated at and after the time instant T1. As a result, the period required for the BGL and the knock determination threshold value THD to catch up with the right values can be shortened from the period P3 to the period P1. However, as an adverse effect of weakening the filtering effect, the behaviors of the BGL and the knock determination threshold value THD fluctuate in comparison with those in FIG. 3(B), after the BGL and the knock determination threshold value THD catch up with the right values.

Accordingly, in FIG. 3(D), considering the transient behavior of the characteristic value PKL at a time when the internal combustion engine is started and the convergence performance thereof, the filter coefficient changing period is set in such a way that in the first half (from the time instant T0 to the time instant T3) of the starting period, filtering operation is performed by use of filter coefficients (F1=Ms and F2=Ns), for the starting time, that are weakened in the filtering effects thereof, and in the second half (at and after the time instant T3) of the starting period, filtering operation is performed by use of filter coefficients (F1=Mn and F2=Nn), for the steady operation, that are strengthened in the tracking capability thereof.

In Embodiment 1 of the present invention, the filter coefficient changing period set by the filter coefficient changing demand unit 102 and the retard calculation limit period set by the retarding amount calculation unit 109 can be set separately with each other. Accordingly, in FIG. 3(D), an example is represented in which the filter coefficient changing period is set to the period P3; in this situation, the retard calculation limit period can be shortened, for example, to the period P2. As a result, the prohibition period of the knock suppression control at a time when the internal combustion engine is started is narrowed in comparison with each of the prohibition periods of the conventional technologies, so that the operation range of the knock suppression control can be expanded.

FIG. 4 is a timing chart for explaining the operation of the internal combustion engine control apparatus according to Embodiment 1 of the present invention; with the abscissa denoting the time, there are represented the respective calculation statuses of the rotation speed of the internal combustion engine, the characteristic value PKL, the BGL, and the knock determination threshold value THD at a time when the fuel cutoff control is cancelled.

FIG. 4(A) represents an example of behavior of the rotation speed of the internal combustion engine at a time when the fuel cutoff control is cancelled; there is represented a behavior at a time when although combustion starts at the time instant T4 because the fuel cutoff control is cancelled, a transient change hardly appears in the rotation speed because the gear of the transmission is connected with the internal combustion engine.

FIG. 4(B) represents in a time series manner the characteristic value PKL (the thin solid line) calculated in a plurality of combustion cycles, the BGL (the thick broken line) at a time when filtering operation is performed by use of the first filter coefficient F1 (=Mn) and the second filter coefficient F2 (=Nn), which are set for the steady operation, and the knock determination threshold value THD (the thick dashed line).

FIG. 4(C) represents in a time series manner the characteristic value PKL (the thin solid line) calculated in a plurality of combustion cycles, the BGL (the thick solid line) at a time when filtering operation is performed by use of the first filter coefficient F1 (=Mf) and the second filter coefficient F2 (=Nf), which are set for a time when the fuel cutoff control is cancelled, and the knock determination threshold value THD (the thick dotted line).

FIG. 4(D) represents in a time series manner the characteristic value PKL (the thin solid line) calculated in a plurality of combustion cycles, the BGL (the thick broken line and the thick solid line) at a time when based on the filter coefficient changing period set according to the present invention, filtering operation is performed by changing, halfway through the process, the respective filter coefficients (F1=Mf and F2=Nf) for a time when the fuel cutoff control is cancelled and the respective filter coefficient (F1=Mn and F2=Nn) for the steady operation, and the knock determination threshold value THD (the thick dashed line and the thick dotted line).

In FIGS. 4(A) through 4(D), when the internal combustion engine is released from the fuel cutoff control at the time instant T4, the inner-cylinder state changes from the non-combustion state to the combustion state even when the rotation speed does not largely change, whereupon the characteristic value PKL largely fluctuates. In FIGS. 4(B), 3(C), and 3(D), the respective waveforms of the characteristic values PKLs are the same.

In FIG. 4(B), filtering operation is performed by use of the filter coefficients (F1=Mn and F2=Nn) set based on the assumption that the internal combustion engine is in a steady operation status for the transient behavior of the characteristic value PKL at a time when the fuel cutoff control is cancelled; therefore, the calculation of the BGL and the knock determination threshold value THD is delayed in the period P6 (from the time instant T4 to the time instant T7), and the characteristic value PKL exceeds the knock determination threshold value THD in the period P5 (from the time instant T4 to the time instant T6), whereby knock determination is erroneously performed.

In contrast, in FIG. 4(C), filtering operation is performed by use of the filter coefficients (F1=Mf and F2=Nf) set in such a way that the calculation is suppressed as much as possible from being delayed in comparison with the transient behavior of the characteristic value PKL at a time when the fuel cutoff control is cancelled; therefore, even though the delay in calculating the BGL and the knock determination threshold value THD remain in the period P4 (from the time instant T4 to the time instant T5), the delay in catching up is eliminated at and after the time instant T5.

As a result, under the circumstance that it cannot be determined that the internal combustion engine is in a transient operation status, the period required for the BGL and the knock determination threshold value THD to catch up with the right values for the transient behavior of the characteristic value PKL can be shortened from the period P6 to the period P4. However, as an adverse effect of weakening the filtering effect, the behaviors of the BGL and the knock determination threshold value THD fluctuate in comparison with those in FIG. 4(B), after the BGL and the knock determination threshold value THD catch up with the right values.

Accordingly, in FIG. 4(D), considering the transient behavior of the characteristic value PKL at a time when the fuel cutoff control is cancelled and the convergence performance thereof, the filter coefficient changing period is set in such a way that in the period (from the time instant T4 to the time instant T5) immediately after the fuel cutoff control is cancelled, filtering operation is performed by use of filter coefficients (F1=Mf and F2=Nf), for the time after the fuel cutoff is cancelled, that are weakened in the filtering effects thereof, and at and after the time instant T5, filtering operation is performed by use of filter coefficients (F1=Mn and F2=Nn), for the steady operation, that are strengthened in the tracking capability thereof.

In Embodiment 1 of the present invention, the filter coefficient changing period set by the filter coefficient changing demand unit 102 and the retard calculation limit period set by the retarding amount calculation unit 109 can be set separately with each other. Accordingly, in FIG. 4(D), an example is represented in which the filter coefficient changing period is set to the period P5; in the case where as represented in FIG. 4(D), no erroneous detection is implemented in the period from the time instant T4 to the time instant T5, the retard calculation limit period can be shortened, for example, to "0". As a result, the prohibition of the knock suppression control at a time when the fuel cutoff control is cancelled can be stopped, whereby the operation range of the knock suppression control can be expanded.

Figure 5:
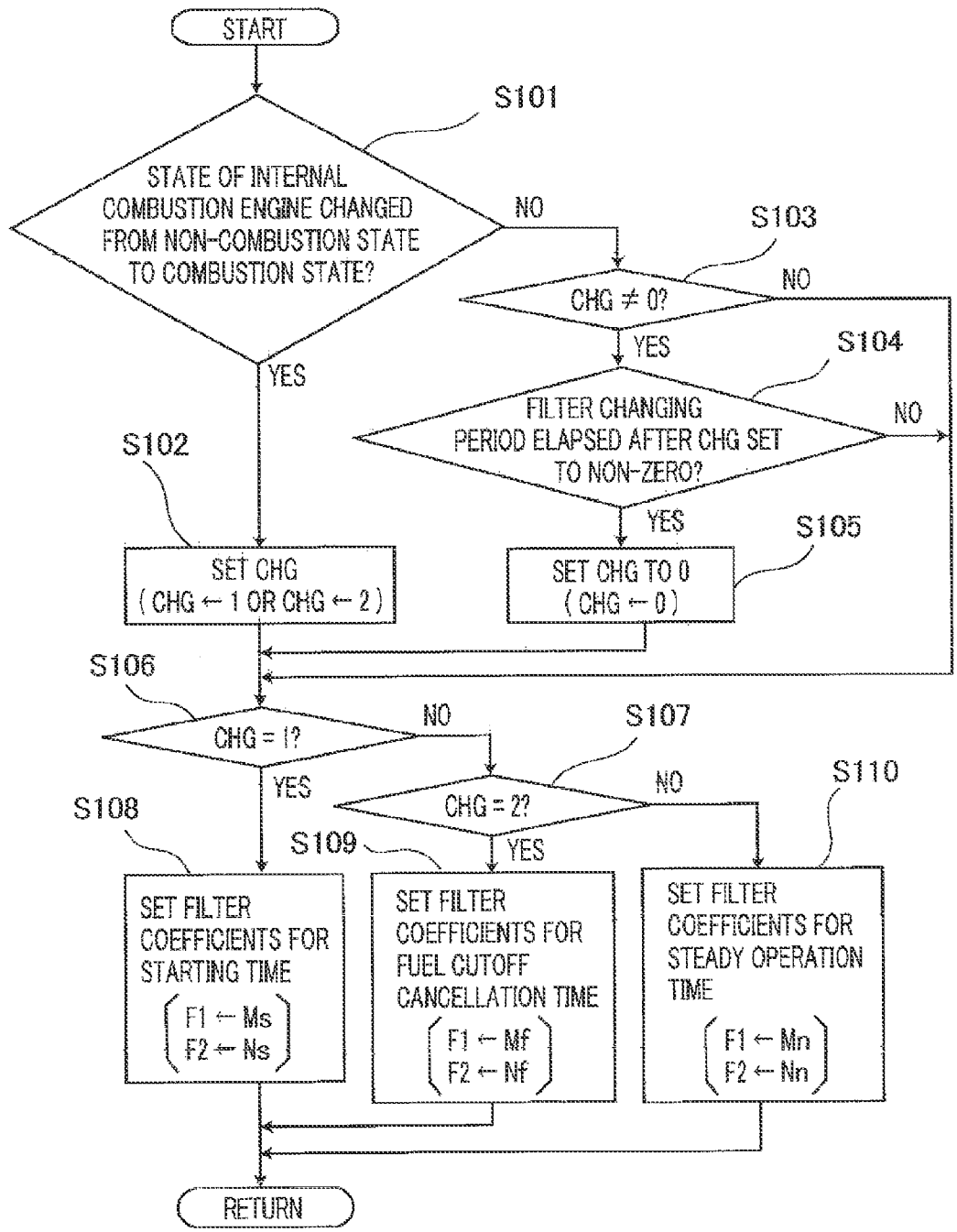
FIG. 5 is a flowchart for explaining filter coefficient switching processing in an internal combustion engine control apparatus according to Embodiment 1 of the present invention.

Next, there will be explained the operation of the knock suppression function in the internal combustion engine control apparatus according to Embodiment 1 of the present invention. FIG. 5 is a flowchart for explaining filter coefficient changing processing in the internal combustion engine control apparatus according to Embodiment 1 of the present invention. At first, with reference to FIG. 5, there will be explained processing performed when filter coefficients are changed by the combustion start determination unit 101, the filter coefficient changing demand unit 102, the BGL calculation unit 104, and the standard deviation calculation unit 105.

In FIG. 5, in the step S101, the combustion start determination unit 101 determines whether or not the present time is a time immediately after the inner-cylinder state has changed from the non-combustion state to the combustion state. In the case where the result of the determination in the step S101 is "YES", the step S101 is followed by the step S102, where the filter coefficient changing demand unit 102 sets the filter coefficient changing demand CHG to a non-zero value ("1" or "2"); then, the step S102 is followed by the step S106.

In contrast, in the case where the result of the determination in the step S101 is "NO", the step S101 is followed by the step S103. In the step S103, it is determined whether or not the filter coefficient changing demand CHG is a non-zero value (CHG=1 or CHG=2). In the case where the result of the determination in the step S103 is "YES", the step S103 is followed by the step S104. In contrast, in the case where the result of the determination in the step S103 is "NO", the step S103 is followed by the step S106.

In the step S104, it is determined whether or not a predetermined filter changing time has elapsed from a time instant when the filter coefficient changing demand CHG was set to a non-zero value (CHG=1 or CHG=2). In the case where the result of the determination in the step S104 is "YES", the step S104 is followed by the step S105, where the filter coefficient changing demand CHG is reset to "0"; then, the step S105 is followed by the step S106. In the case where the result of the determination in the step S104 is "NO", the step S104 is followed by the step S106.

In each of the steps S106 and S107, it is determined to which value out of "0" (a demand at a time when the internal combustion engine is in the steady operation), "1" (a demand at a time when the internal combustion engine is started), and "2" (a demand at a time when the fuel cutoff control is cancelled) the filter coefficient changing demand CHG is set. In the case where the filter coefficient changing demand CHG is "0", the respective results of the determinations in the steps S106 and S107 become "NO"; thus, the step S106 is followed by the step S107 and then by the step S110, where the first filter coefficient F1 and the second filter coefficient F2 are set to Mn and Nn, respectively, which are filter coefficients at a time when the internal combustion engine is in the steady operation; then, the processing is ended.

In contrast, in the case where the filter coefficient changing demand CHG is "1", the result of the determinations in the step S106 becomes "YES"; thus, the step S106 is followed by the step S108, where the first filter coefficient F1 and the second filter coefficient F2 are set to Ms and Ns, respectively, which are filter coefficients at a time when the internal combustion engine is started; then, the processing is ended.

In the case where the filter coefficient changing demand CHG is "2", the results of the determinations in the steps S106 and S107 become "NO" and "YES", respectively; thus, the step S106 is followed by the step S107 and then by the step S109, where the first filter coefficient F1 and the second filter coefficient F2 are set to Mf and Nf, respectively, which are filter coefficients at a time when the fuel cutoff control is cancelled; then, the processing is ended.

Figure 6:
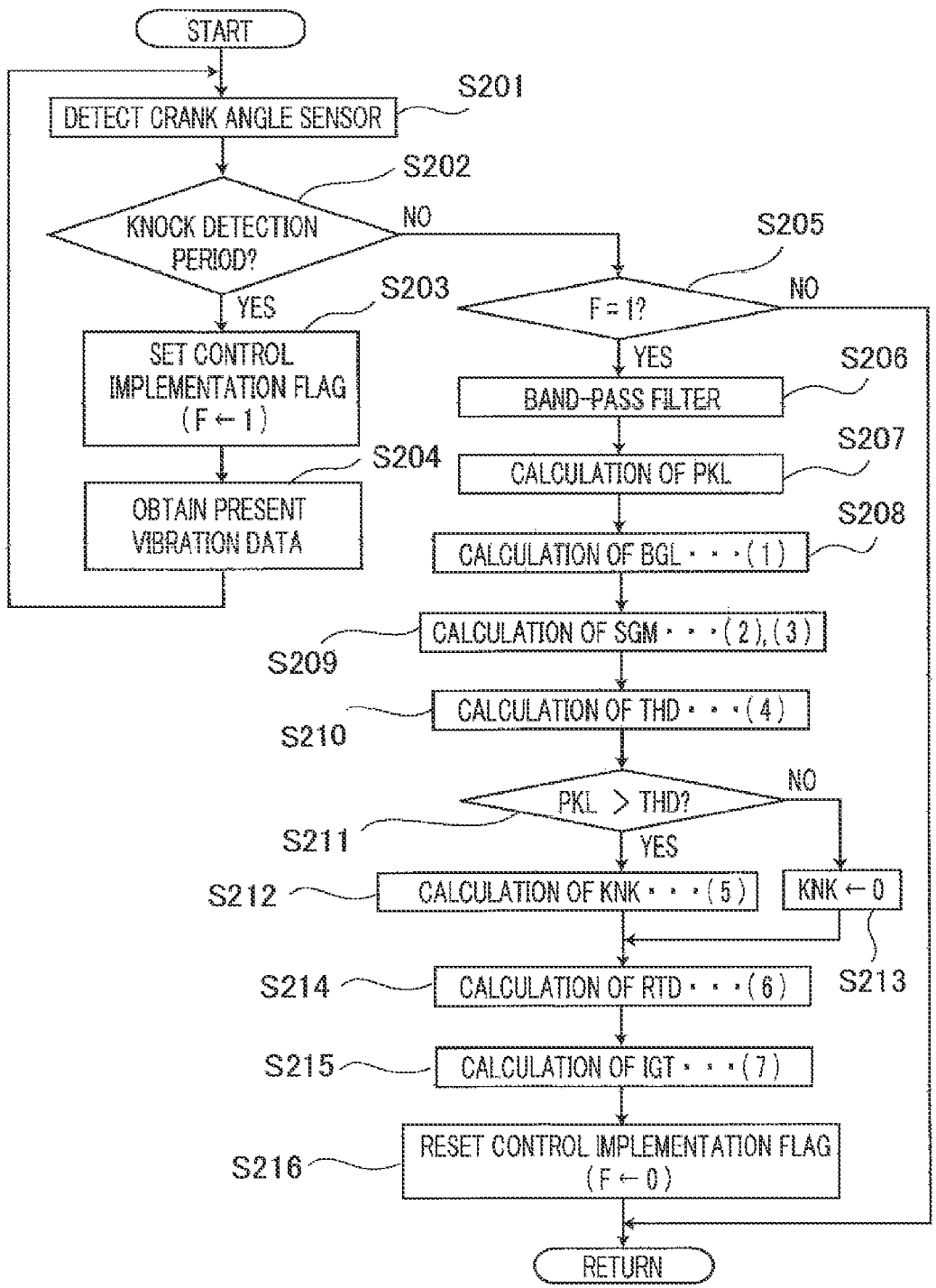
FIG. 6 is a flowchart for explaining the control operation of a knock suppression function in an internal combustion engine control apparatus according to Embodiment 1 of the present invention.

Next, FIG. 6 is a flowchart for explaining the control operation of a knock suppression function in an internal combustion engine control apparatus according to Embodiment 1 of the present invention. In FIG. 6, at first, in the step S201, the crank angle sensor 9 detects a crank angle; in the next step S202, based on the crank angle detected in the step S201, it is determined whether or not the present time is in a knock detection period.

In the case where the result of the determination in the step S202 is "YES", the step 202 is followed by the step S203, where a flag F for making the knock suppression control effective is set to "1"; then, the step S203 is followed by the step S204, where vibration data detected by the knock sensor 11 is obtained; then, the step S201 is resumed.

The loop process from the step S201 to the step S204 is repeated until the crank angle detected by the crank angle sensor 9 departs from the knock detection period; vibration data pieces detected in steps of crank angle are temporarily stored as a continuous signal within the knock detection period in one combustion cycle. When the crank angle detected by the crank angle sensor 9 departs from the knock detection period, the result of the determination in the step S202 becomes "NO"; then, the loop process is ended and followed by the step S205.

In the step S205, it is determined whether or not the flag F for making the knock suppression control effective has been set to "1". In the case where it is determined that the flag F for making the knock suppression control effective has been set to "1" ("YES"), processing items of the knock suppression control in and after the step S206 are implemented In the case where it is determined that the flag F for making the knock suppression control effective has not been set to "1" ("NO"), the processing items of the knock suppression control from the step S206 to the step S216 are not implemented; then, the process is ended.

In the case where the result of the determination in the step S205 is "YES", the step S205 is followed by the step S206, where band-pass filter processing is applied to the presently stored vibration data within the knock detection period in one combustion cycle so that only specific-frequency vibration components are extracted; then, the step S206 is followed by the step S207. Then, in the step S207, the maximum value of the specific-frequency vibration components extracted in the step S206 is determined as the characteristic value PKL that characterized the vibration level in the present combustion cycle; then, the step S207 is followed by the step S208.

In the step S208, the BGL is calculated by use of the equation (1); in the step S209, the variance VAR and the standard deviation SGM are calculated by use of the equations (2) and (3), respectively. The respective values determined in the flowchart represented in FIG. 5 are applied to the first filter coefficient F1 at a time when the BGL is calculated in the step S208 and the second filter coefficient F2 at a time when the variance VAR is calculated in the step S209.

In the step S210, the knock determination threshold value THD is calculated by use of the equation (4); in the next step S211, the characteristic value PKL and the knock determination threshold value THD are compared with each other, so that it is determined whether or not a knock has been produced. In the case where the result of the determination in the step S211 is "YES", it is determined that a knock has been produced, and the step S211 is followed by the step S212, where the knock intensity KNK is calculated by use of the equation (5); then, the step S212 is followed by the step S214. In the case where the result of the determination in the step S211 is "NO", it is determined that no knock has been produced, and the step S211 is followed by the step S213, where the knock intensity KNK is set to "0"; then, the step S213 is followed by the step S214.

Next, in the step S214, based on the knock intensity KNK, the knock retarding amount RTD is calculated by use of the equation (6); then, in the step S215, by use of the equation (7), the final ignition timing IGT is calculate by shifting the basic ignition timing IGB by the knock retarding amount RTD toward the retarding side; then, the step S215 is followed by the step S216. In the step S216, the flag F for making the knock suppression control effective is set to "0"; then, the processing is ended.

When through a series of foregoing processing items, it is determined that a knock has been produced, based on the vibration of the internal combustion engine detected by the knock sensor, the ignition timing is corrected by being shifted toward the retarding side in accordance with the intensity of the vibration caused by the knock, so that the occurrence of a knock is suppressed.

Figure 7:
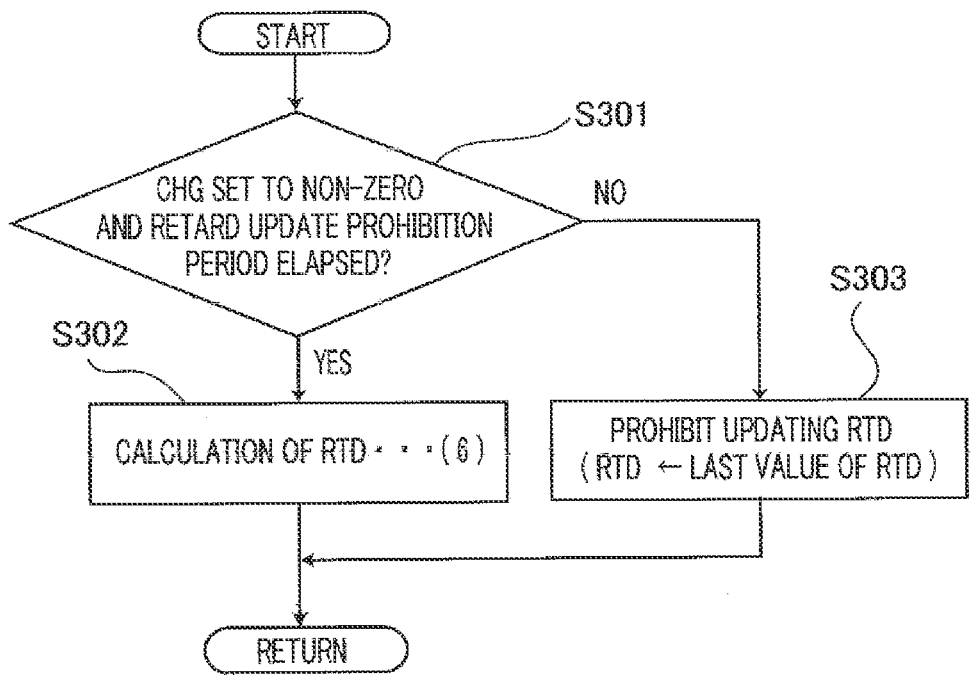
FIG. 7 is a flowchart for explaining the control operation of a retarding amount calculation unit in an internal combustion engine control apparatus according to Embodiment 1 of the present invention.

FIG. 7 is a flowchart for explaining the control operation of the retarding amount calculation unit in the internal combustion engine control apparatus according to Embodiment 1 of the present invention; additional control operation by the retarding amount calculation unit 109 is represented. The processing represented in FIG. 7 is implemented in the step S214 in FIG. 6 where the knock retarding amount RTD is calculated.

In FIG. 7, at first, in the step S301, it is determined whether or not the filter coefficient changing demand CHG has been set to a non-zero value (CHG=1 or CHG=2) in the step S102 represented in FIG. 5 and a predetermined retard calculation limit period has elapsed from a time instant when the filter coefficient changing demand CHG was set to the non-zero value. In the case where the result of the determination in the step S301 is "YES", the step S301 is followed by the step S302, where as explained in the step S214 represented in FIG. 6, the knock retarding amount RTD is calculated by use of the equation (6).

In contrast, in the case where the result of the determination in the step S301 is "NO", the step S301 is followed by the step S303, where the knock retarding amount RTD is prohibited from being updated (e.g., the last value of the RTD is kept) or the RTD is prohibited from being calculated (the RTD is reset to "0"). As a result, the knock retarding amount RTD is prohibited from being updated in the period from the time instant when the filter coefficient changing demand CHG is set to a non-zero value to the time instant when a predetermined retard calculation limit period elapses, so that there is prevented an erroneous retarding caused by a knock mal-detection performed immediately after when the inner-cylinder state has changed from the non-combustion state to the combustion state.

In the case where when the filter coefficients are changed to the side where the filtering effect is weakened, no knock mal-detection is performed, the retard calculation limit period can be shortened, for example, up to zero. In this case, the result of the determination in the step S301 becomes "NO", and the knock retarding amount RTD is not prohibited from being updated; then, the step S301 is followed by the step S302, where the knock retarding amount RTD is calculated by use of the equation (6).

The internal combustion engine control apparatuses according to Embodiment 1 of the present invention, described heretofore, are the ones obtained by putting the following inventions into practice.

1. An internal combustion engine control apparatus comprising:
   a knock sensor that detects a vibration produced in an internal combustion engine;
   a crank angle sensor that detects a crank angle of the internal combustion engine;
   a characteristic value calculation unit that calculates a characteristic value for characterizing a vibration level of the vibration in a predetermined crank angle range, based on the vibration detected in the predetermined crank angle range;
   a background level calculation unit that calculates a background level of the characteristic value, based on the characteristic value and a first filter coefficient utilized for averaging the characteristic value;
   a standard deviation calculation unit that calculates a standard deviation of the characteristic value, based on the characteristic value, the background level, and a second filter coefficient utilized for calculating a standard deviation of the characteristic value;
   a threshold value calculation unit that calculates a knock determination threshold value, based on the background level and the standard deviation;
   a knock determination unit that determinates whether or not a knock has been produced, based on the characteristic value and the knock determination threshold value;
   a knock intensity calculation unit that calculates a knock intensity, based on the characteristic value, the background level, and the knock determination threshold value, when the knock determination unit determines that a knock has been produced;
   a retarding amount calculation unit that calculates a knock retarding amount for an ignition timing of the internal combustion engine, based on the knock intensity;
   an ignition timing correction unit that corrects an ignition timing, based on the knock retarding amount;
   a combustion start determination unit that determines, based on the various information items indicating operation statuses of the internal combustion engine, whether or not the inner-cylinder state of the internal combustion engine has changed from a non-combustion state to a combustion state; and
   a filter coefficient changing demand unit that outputs a filter coefficient changing demand until a predetermined filter coefficient changing period elapses from the time instant when the combustion start determination unit determines that the inner-cylinder state of the internal combustion engine has changed from a non-combustion state to a combustion state to the time instant, wherein based on the filter coefficient changing demand issued by the filter coefficient changing demand unit, at least one of (1) and (2) below is performed:
   (1) The background level calculation unit changes the value of the first filter coefficient to the one with which a filtering effect is weakened.
   (2) The standard deviation calculation unit changes the value of the second filter coefficient to the one with which a filtering effect is weakened.
2. The internal combustion engine control apparatus, wherein the combustion start determination unit determines that the inner-cylinder state of the internal combustion engine has changed from a non-combustion state to a combustion state, when starting operation for starting the internal combustion engine in the stop mode is started.
   At a time of starting, in particular, the present invention suppresses erroneous knock determination caused by a filtering-operation delay in tracking a change in the vibration level, without narrowing the operation range of the knock suppression function at a time immediately after the inner-cylinder state of the internal combustion engine has changed from the non-combustion state to the combustion state.
3. The internal combustion engine control apparatus, wherein the combustion start determination unit determines that the inner-cylinder state of the internal combustion engine has changed from the non-combustion state to the combustion state, when the internal combustion engine under fuel cutoff control is released from implementation of the fuel cutoff control and a fuel-air mixture is ignited in a cylinder in which fuel injection has been resumed.
   At a time when the fuel cutoff control is cancelled, in particular, the present invention suppresses erroneous knock determination caused by a filtering-operation delay in tracking a change in the vibration level, without narrowing the operation range of the knock suppression function at a time immediately after the inner-cylinder state of the internal combustion engine has changed from the non-combustion state to the combustion state.
4. The internal combustion engine control apparatus, wherein the retarding amount calculation unit prohibits the knock retarding amount from being updated or from being calculated until a predetermined retard calculation limit period elapses from a time instant when at least one of the first filter coefficient and the second filter coefficient has been changed to the side in which a filtering effect is weakened.
   The present invention securely prevents erroneous knock determination caused by a filtering-operation delay in tracking a change in the vibration level, without narrowing the operation range of the knock suppression function at a time immediately after the inner-cylinder state of the internal combustion engine has changed from the non-combustion state to the combustion state.
5. The internal combustion engine control apparatus, wherein the retard calculation limit period set by the retarding amount calculation unit is set to a period that is the same as or shorter than the filter coefficient changing period set by the filter coefficient changing demand unit.
   The present invention securely prevents erroneous knock determination caused by a filtering-operation delay in tracking a change in the vibration level, while expanding the operation range of the knock suppression function at a time immediately after the inner-cylinder state of the internal combustion engine has changed from the non-combustion state to the combustion state.

The present invention described heretofore is useful for realizing an internal combustion engine control apparatus that prevents erroneous knock determination caused when due to a change in the vibration level, a filtering-operation tracking is delayed and hence the knock determination threshold value becomes an inappropriate value, without narrowing the operation range of the knock suppression function at a time immediately after the inner-cylinder state of the internal combustion engine has changed from the non-combustion state to the combustion state.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus comprising:
   a knock sensor that detects a vibration produced in an internal combustion engine;
   a crank angle sensor that detects a crank angle of the internal combustion engine;
   a characteristic value calculation unit that calculates a characteristic value for characterizing a vibration level of the vibration in a predetermined crank angle range, based on the vibration detected in the predetermined crank angle range;
   a background level calculation unit that calculates a background level of the characteristic value, based on the characteristic value and a first filter coefficient utilized for averaging the characteristic value;
   a standard deviation calculation unit that calculates a standard deviation of the characteristic value, based on the characteristic value, the background level, and a second filter coefficient utilized for calculating a standard deviation of the characteristic value;
   a threshold value calculation unit that calculates a knock determination threshold value, based on the background level and the standard deviation;
   a knock determination unit that determinates whether or not a knock has been produced, based on the characteristic value and the knock determination threshold value;
   a knock intensity calculation unit that calculates a knock intensity, based on the characteristic value, the background level, and the knock determination threshold value, when the knock determination unit determines that a knock has been produced;
   a retarding amount calculation unit that calculates a knock retarding amount for an ignition timing of the internal combustion engine, based on the knock intensity;

an ignition timing correction unit that corrects an ignition timing, based on the knock retarding amount;

a combustion start determination unit that determines, based on the various information items indicating operation statuses of the internal combustion engine, whether or not the inner-cylinder state of the internal combustion engine has changed from a non-combustion state to a combustion state; and a filter coefficient changing demand unit that outputs a filter coefficient changing demand until a predetermined filter coefficient changing period elapses from the time instant when the combustion start determination unit determines that the inner-cylinder state of the internal combustion engine has changed from a non-combustion state to a combustion state to the time instant, wherein based on the filter coefficient changing demand issued by the filter coefficient changing demand unit, at least one of (1) and (2) below is performed:

(1) The background level calculation unit changes the value of the first filter coefficient to the one with which a filtering effect is weakened, (2) The standard deviation calculation unit changes the value of the second filter coefficient to the one with which a filtering effect is weakened.

2. The internal combustion engine control apparatus according to claim 1, wherein the retarding amount calculation unit prohibits the knock retarding amount from being updated or from being calculated until a predetermined retard calculation limit period elapses from a time instant when at least one of the first filter coefficient and the second filter coefficient has been changed to the one with which a filtering effect is weakened.

3. The internal combustion engine control apparatus according to claim 1, wherein the combustion start determination unit determines that the inner-cylinder state of the internal combustion engine has changed from a non-combustion state to a combustion state, when starting operation for starting the internal combustion engine in the stop mode is started.

4. The internal combustion engine control apparatus according to claim 3, wherein the retarding amount calculation unit prohibits the knock retarding amount from being updated or from being calculated until a predetermined retard calculation limit period elapses from a time instant when at least one of the first filter coefficient and the second filter coefficient has been changed to the one with which a filtering effect is weakened.

5. The internal combustion engine control apparatus according to claim 1, wherein the combustion start determination unit determines that the inner-cylinder state of the internal combustion engine has changed from the non-combustion state to the combustion state, when the internal combustion engine under fuel cutoff control is released from implementation of the fuel cutoff control and a fuel-air mixture is ignited in a cylinder in which fuel injection has been resumed.

6. The internal combustion engine control apparatus according to claim 5, wherein the retarding amount calculation unit prohibits the knock retarding amount from being updated or from being calculated until a predetermined retard calculation limit period elapses from a time instant when at least one of the first filter coefficient and the second filter coefficient has been changed to the one with which a filtering effect is weakened.

7. The internal combustion engine control apparatus according to claim 6, wherein the retard calculation limit period set by the retarding amount calculation unit is set to a period that is the same as or shorter than the filter coefficient changing period set by the filter coefficient changing demand unit.

* * * * *